Oct. 15, 1935.    K. CLARK    2,017,202
GATE MECHANISM
Filed July 26, 1934
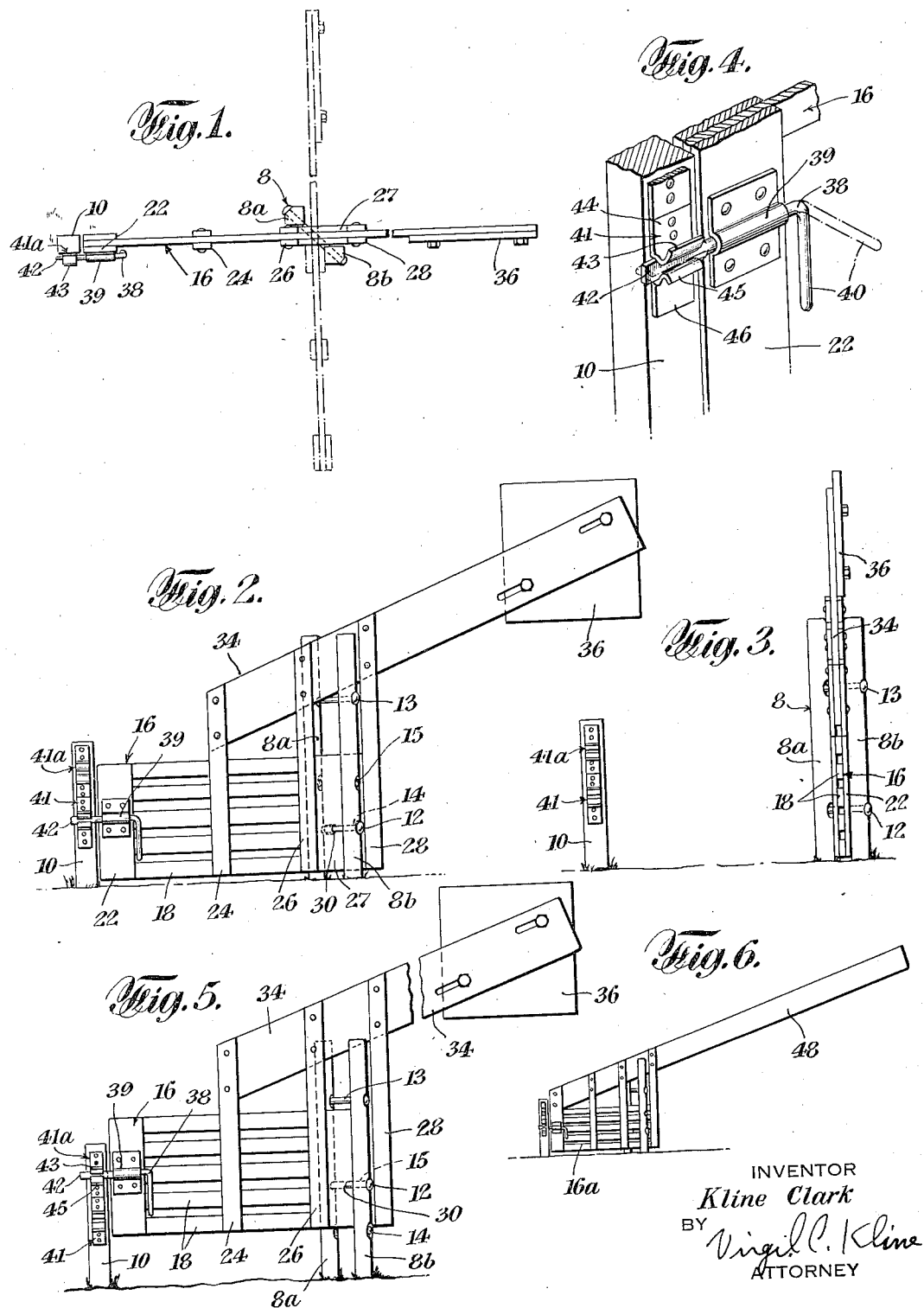
INVENTOR
Kline Clark
BY Virgil C. Kline
ATTORNEY Patented Oct. 15, 1935

2,017,202

UNITED STATES PATENT OFFICE 2,017,202

GATE MECHANISM

Kline Clark, Savannah, Mo.

Application July 26, 1934, Serial No. 737,042

6 Claims. (Cl. 39—14)

The present invention relates to an improved gate which will not tend to sag and which can be easily operated under adverse conditions.

It is a particular object of the invention to construct a gate which can be readily moved to open and closed position over broken or uneven ground. It is a further object to provide a gate which can be opened and closed with a minimum of effort even in the presence of a high wind.

The above and other objects will appear more fully from the following description when considered in connection with the drawing in which:

Fig. 1 is a plan view of the gate and the supporting posts.

Fig. 2 is an elevational view thereof.

Fig. 3 is an end view illustrating the gate in open position.

Fig. 4 is an enlarged fragmentary view of a preferred form of gate latch.

Fig. 5 is a view similar to Fig. 2 showing the gate in elevated position.

Fig. 6 is an elevational view illustrating a modified form of the invention.

The gate is designed to normally close the opening between the fixed support 8 and the post 10 to which the gate latch keeper is attached. The support 8 is preferably formed of a pair of posts 8a and 8b, one on each side of the gate and diagonally arranged with respect to the gate when in closed position as shown in Fig. 1. The posts 8a and 8b thus support the gate in vertical position either in the closed position shown in full lines or in the open dotted line position (Fig. 1). The posts 8a and 8b are connected together by two or more bolts 12 and 13, the latter being a stationary bolt and serving merely to hold the posts in their assembled relation. The lower bolt 12 serves as a pivotal support for the gate. If desired the bearing surface may be increased by inserting a sleeve or bushing over the portion of the pin 12 between the posts 8a and 8b. Two or more sets of openings 14 and 15 extend through the posts, the bolt 12 being capable of being inserted and retained in either of these openings.

The gate proper 16 may be of any desired form and constructed either of wood or metal. As illustrated it is formed of a series of horizontal boards 18 connected by pairs of vertical members 22, 24, 26, 27, and 28. An opening 30 formed near the rearward edge of the gate and extending through the vertical members 27 is designed to receive the bolt 12. The opening is somewhat elongated so that the gate can be turned from open to closed position while supported on the pin 12. A slight longitudinal movement of the gate can also be afforded to the extent of the elongation of the slot 30. Obviously the vertical boards 27 may be omitted and the pin may be passed between two of the horizontal boards 18 (see Fig. 6).

While a gate constructed as described above could be used satisfactorily and could be readily opened and closed, it has been found that the control of the gate is greatly facilitated by employing a counterbalance comprising an elongated beam 34 rigidly secured between the vertical boards 24, 26, and 28. The beam 34 extends upwardly and rearwardly of the gate to a substantial distance beyond the support 8 as shown for example in Fig. 2. In order to increase the effect of the counterbalance in weight and also in wind resistance a sheet metal plate 36 is attached to the outer extremity of the beam 34 and if desired the position of the plate can be adjusted longitudinally of the beam to give the desired effect. The moment of force of the projecting beam 34 and plate 36 with respect to the supporting element 12 is such as to approximate the moment of force of the gate 16 so that very little effort is required to raise the forward end of the gate and move it around the supporting bolt 12 to open or closed position. It is preferable to have the moment of force of the gate slightly greater than that of the counterbalance so that the gate will at no time tend to tip upwardly into an inoperative position but instead the gate will remain upon the ground when released.

The latch 38 is constructed to prevent the forward edge of the gate from being moved either laterally or vertically when in latched position. The latch 38, pivoted at 39 to the forward edge of the gate, is formed with a weighted handle 40 and a flattened head 42, the head normally lying in a vertical plane when the weighted end 40 is permitted to drop by gravity to its normal position. In this position the latch is effectively held against movement in any direction by means of the latch keeper 41 formed with upper and lower lugs 44 and 46. The lugs are formed with outwardly projecting lips 43 and 45 spaced slightly to permit the passage of the latch head 42 when the latter is moved to unlatched position but normally forming a recess which securely holds the latch and gate from movement away from latched position.

The gate is normally supported in the vertical position shown in Fig. 2. Under some conditions it is desirable to have the gate positioned substantially above the ground, for example to prevent cattle and horses from moving through the gate but to permit smaller animals such as hogs and sheep to pass readily through the gate. The elevated position of the gate is illustrated in Fig. 5 wherein the pin 12 is mounted in the upper opening 15 on the supporting posts. The gate may be latched in its elevated position in the same manner as in the lowered position since the keeper lugs are duplicated for the elevated position as indicated at 41a.

It will be noted that the rearward projecting end of the beam 34 and the plate 36 are sufficiently high above the ground that the movement of the gate will not be obstructed by interference with fences, shrubbery, animals or the like. Likewise, by reason of the greater elevation of the counterbalance, the latter may be made somewhat reduced in size and still overcome the effect of the wind on the gate since the wind velocity even a few feet above the ground is substantially greater than the wind velocity nearer the ground. The rigid construction of the gate and projecting beam avoids any tendency for the gate to weave and become loose at the joints.

In Fig. 6 there is illustrated a modified form of the invention wherein a single beam 48 is rigidly secured to the gate 16a, the beam extending outwardly and upwardly for a substantial distance beyond the rearward edge of the gate proper. The construction shown in this figure has a particular advantage of cheapness of construction and possesses all of the advantages of the first form of the invention in that the effect of gravity and of the wind is substantially counterbalanced by means of the projecting end of the beam. The area and weight of the plank 48 as in the first form of the invention also approximate the weight and the area of the gate proper but should be somewhat less in both respects in order for the gate normally to remain at rest upon the ground when in unlatched position.

It has been found that with a gate constructed in accordance with either form of the invention that the gate is firmly supported in its closed and latched position. By releasing the latch and with only a slight effort the forward end of the gate can be readily lifted and moved open to a greater or less extent and when released the gate will remain in the position in which released. If the ground beneath the gate is rolling or if stones or sticks obstruct the movement of the gate it is only necessary to raise it over the obstruction and to move it to the desired position. On a hillside the gate is of particular advantage in that it is immaterial as to whether the ground is level or extends up or down grade from the closed position of the gate since the gate could be readily tilted and moved regardless of the contour of the ground.

Having now described my invention, I claim:

1. In a gate mechanism, a supporting post, a movable gate, means for supporting one end of said gate on said post, a counterbalance for said gate comprising an elongated member secured to said gate and extending upwardly and rearwardly beyond said gate for a substantial distance past said supporting means, the rearwardly extending portion of said counterbalance approximating the area and weight of said gate.

2. In a gate mechanism, a post comprising two spaced vertical sections, a gate supporting pin extending between said post sections, a gate, means thereon for pivotally supporting said gate on said pin for horizontal swinging movement and for vertical tilting movement during normal movement of said gate between open and closed positions, a wind and gravity counterbalance attached to said gate and extending rearwardly and upwardly beyond the same, said sections of post constituting a guide for maintaining said gate in a vertical position in both the open and closed positions of said gate.

3. In combination, a movable gate, a post, means on said post and gate for pivotally supporting said gate for movement in a vertical or horizontal plane and for maintaining said gate in substantially vertical position during movements of said gate and a wind and gravity counterbalance on said gate comprising an elongated beam secured rigidly to said gate and extending rearwardly beyond the supporting point thereof, the extended portion of said beam being positioned mainly above the level of said gate to avoid interference with objects the height of said gate.

4. In combination, a movable gate, a post, means on said post and gate for pivotally supporting said gate for movement in a vertical or horizontal plane and for maintaining said gate in substantially vertical position during movements of said gate and a wind and gravity counterbalance on said gate extending rearwardly and upwardly beyond the supporting point thereof, said counterbalance being formed as a plank substantially longer than said gate.

5. In combination, a movable gate, a support comprising a pair of posts diagonally arranged to permit movement of said gate between open and closed positions while supported between said posts, a pin extending from one post to the other and through the rearward end of said gate, forming a pivotal support for normal movement of said gate on a horizontal or vertical axis, a weight and wind counterbalance rigidly secured to said gate and extending above and rearwardly beyond the same and means for latching said gate in closed position.

6. In combination, a movable gate, a post, means on said post and gate for pivotally supporting said gate for tilting or swinging movement in a vertical or horizontal plane and for maintaining said gate in substantially vertical position during movements of said gate and a wind and gravity counterbalance on said gate comprising a beam extending rearwardly beyond the supporting point thereof, said counterbalance approximating the area and weight of said gate to facilitate operation of the gate.

KLINE CLARK.